United States Patent
Mori

(10) Patent No.: US 7,269,444 B2
(45) Date of Patent: Sep. 11, 2007

(54) PORTABLE TERMINAL DEVICE AND COMMUNICATION CONTROL METHOD

(75) Inventor: Shinichiro Mori, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 393 days.

(21) Appl. No.: 09/984,406

(22) Filed: Oct. 30, 2001

(65) Prior Publication Data

US 2002/0107041 A1    Aug. 8, 2002

(30) Foreign Application Priority Data

Feb. 5, 2001    (JP)    ............................. 2001-028713

(51) Int. Cl.
*H04B 1/38*    (2006.01)
(52) U.S. Cl. ................... 455/557; 455/556.1; 455/527; 455/41.2
(58) Field of Classification Search ................ 455/527, 455/557, 567, 464, 434, 406, 41.2, 41.1, 455/556.1; 370/338, 402, 425
See application file for complete search history.

(56) References Cited

U.S. PATENT DOCUMENTS

| | | | |
|---|---|---|---|
| 5,590,417 A * | 12/1996 | Rydbeck ................... | 455/575.2 |
| 5,689,802 A * | 11/1997 | Luzzatto ..................... | 455/11.1 |
| 6,377,608 B1 * | 4/2002 | Zyren ......................... | 375/132 |
| 6,487,180 B1 * | 11/2002 | Borgstahl et al. ........... | 370/310 |
| 6,546,238 B1 * | 4/2003 | Nightingale et al. ........ | 455/406 |
| 6,560,443 B1 * | 5/2003 | Vaisanen et al. ............. | 455/73 |
| 6,571,103 B1 * | 5/2003 | Novakov ..................... | 455/464 |
| 6,580,704 B1 * | 6/2003 | Wellig et al. ................ | 370/338 |
| 6,741,870 B1 * | 5/2004 | Holmstrom et al. ........ | 455/557 |
| 6,795,688 B1 * | 9/2004 | Plasson et al. .............. | 455/41.2 |
| 6,876,642 B1 * | 4/2005 | Adams et al. ............... | 370/338 |
| 7,006,584 B1 * | 2/2006 | Nagashima .................. | 375/324 |
| 2002/0147008 A1 * | 10/2002 | Kallio .......................... | 455/426 |
| 2002/0187791 A1 * | 12/2002 | Ohta et al. ................... | 455/456 |
| 2003/0008662 A1 * | 1/2003 | Stern et al. .................. | 455/456 |
| 2003/0032460 A1 * | 2/2003 | Cannon et al. ............. | 455/569 |
| 2003/0046421 A1 * | 3/2003 | Horvitz et al. .............. | 709/238 |

(Continued)

FOREIGN PATENT DOCUMENTS

DE    43 10230 A    6/1994

(Continued)

OTHER PUBLICATIONS

Communication from European Patent Office dated Jun. 15, 2004 in Application No. EP 01 309 219.2.

(Continued)

*Primary Examiner*—Matthew Anderson
*Assistant Examiner*—Tan Trinh
(74) *Attorney, Agent, or Firm*—Westerman, Hattori, Daniels & Adrian, LLP.

(57) ABSTRACT

A portable terminal device includes a first radio communication part provided in the device for performing a wireless communication with a first network and a second radio communication part built in the device for performing a wireless communication with a second network. The portable terminal device further includes a control part for, upon reception of an incoming call request from the first network, selecting an apparatus from apparatuses which have established communications over the second network with the second radio communication part, in accordance with a predetermined order of priority and a communication adapting part for establishing a communication between the selected apparatus and the first network.

18 Claims, 9 Drawing Sheets

U.S. PATENT DOCUMENTS

2003/0073424 A1*  4/2003  Nunally ...................... 455/404
2003/0081506 A1*  5/2003  Karhu ......................... 368/10
2005/0009561 A1*  1/2005  Hollstrom et al. ....... 455/556.1

FOREIGN PATENT DOCUMENTS

| EP | 0 773 685 A1 | 5/1997 |
|----|--------------|--------|
| EP | 0 840 465 A  | 6/1998 |
| EP | 1 052 834 A  | 11/2000 |
| JP | 5-83381      | 4/1993 |
| JP | 2000-341753  | 12/2000 |
| WO | WO97/34403   | 9/1997 |
| WO | WO98/12882   | 3/1998 |

OTHER PUBLICATIONS

Office action and translation dated Sep. 29, 2003 from the corresponding European application.

"Bluetooth- The universal radio interface for *ad hoc*, wireless connectivity" by Jaap Haartsen, from Ericsson Review, No. 3, 1998, pp. 110-117.

* cited by examiner

| ITEM | CALLING-SERVER CALLER-ID |
|---|---|
| 1 | 090-1111-2222 |
| 2 | 0426-11-2222 |
| 3 | 044-777-1111 |
| ⋮ | ⋮ |

| ITEM | DEVICE NAME | DEVICE ID | FIXED ADDRESS | PRIORITY | APPLICABLE TIME | APPLICABLE LOCATION | OTHERS |
|---|---|---|---|---|---|---|---|
| 1 | PEN-TYPE HANDSET | 0001 | HI4194002500 | 8 | N/A | NOT AT HOME | PREFERENTIALLY APPLIED FOR INFORMATION OTHER THAN TELEPHONE CALL OR E-MAIL |
| 2 | Navi HANDSFREE | 0002 | HI4149002514 | 2 | N/A | IN CAR | |
| 3 | PORTABLE HANDSET | 0003 | HI4147560123 | 4 | N/A | NOT AT HOME | |
| 4 | HANDSET WITH MUSIC REPRODUCING FUNCTION | 0004 | HI2348576734 | 3 | N/A | N/A | |
| 5 | HANDSET WITH ILLUMINATION | 0005 | HI6576342347 | 3 | AFTER 5 p.m. | N/A | |
| | | | | | | | |

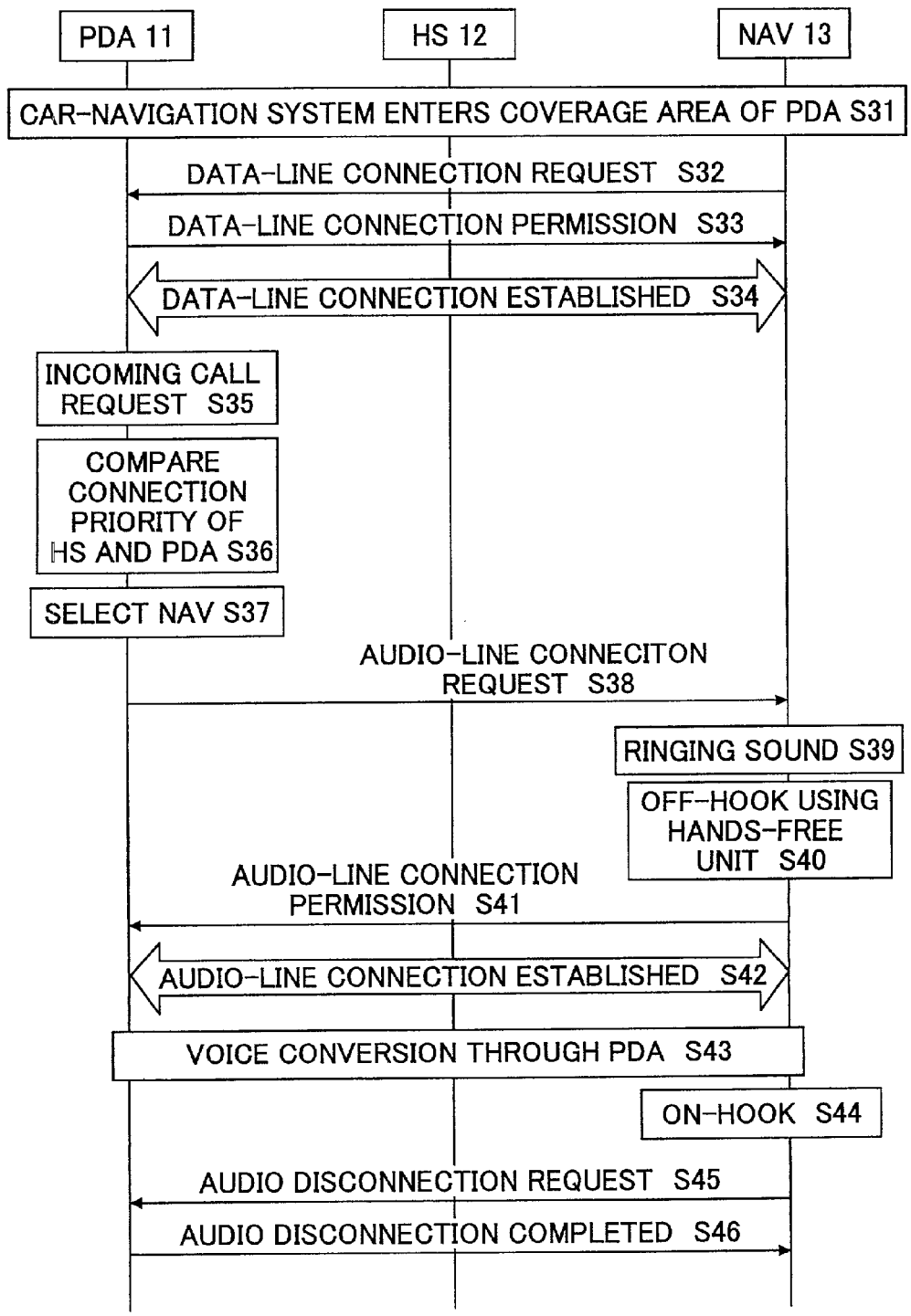

PORTABLE TERMINAL DEVICE AND COMMUNICATION CONTROL METHOD

BACKGROUND OF THE INVENTION

1. Field of the Invention

The present invention relates to a portable terminal device and a communication control method, and particularly relates to a portable terminal device having a local built-in radio communication device and a communication control method for controlling such a portable terminal device.

2. Description of the Related Art

Recently, with the spread of cellular phone system, various techniques have been developed to accomplish communications between networks and portable terminal devices. It is known to design a portable terminal device as a personal digital assistant (PDA) provided with a built-in cellular phone which can establish a connection with a network. It is also known to connect a personal digital assistant to a cellular phone for providing communications with a network. On the other hand, a car-mount navigation system with hands-free capability is known. For hands-free operation, in which a phone conversation may be made without holding a handset, a car-navigation system is wire-connected to a cellular phone.

In order to provide communication capability to a known portable terminal device, the portable terminal device may be connected to a cellular phone or may be provided with a built-in communication device. Conventionally, the portable terminal device having a built-in communication device is further provided with a handset to enable phone conversations.

Another way of providing communication capability to a portable terminal device having a built-in communication device is to connect it to hands-free capability of the car-mount navigation system. However, the portable terminal device must be taken out of a storing location such as a bag or a pocket of a jacket and connected to a car-mount terminal such as a car navigation system. When the user leaves the vehicle, the portable terminal device must be separated from the car navigation system and stored in the storing location such as a bag or a pocket of a jacket. This is considerably troublesome to the user. Also, if the user forgets to remove the portable terminal device from the car navigation system and leaves the vehicle, the portable terminal device cannot be used for making phone conversations.

Also, with the spread of portable terminal devices having built-in communication devices, a so-called push-type data distribution service has also become wide-spread in which data is distributed from a server connected to a wide-area network (WAN). Conventionally, the push-type data distribution service has been realized using radio communication devices dedicated for data communication.

In order to make use of the push-type data distribution service using a conventional portable terminal device, it is necessary to mount a radio communication device dedicated for data communications. This causes problems since the handling of voice and data is rather complicated.

Further, if there are both a normally used handset and a hands-free function of the navigation system, there are two means for making phone conversations (voice input/output means). This causes a problem since it may confuse the user.

SUMMARY OF THE INVENTION

Accordingly, it is a general object of the present invention to provide a portable terminal device which can solve the problems described above.

It is another and more specific object of the present invention to provide a portable terminal device with improved operability and a communication control method thereof.

In order to achieve the above objects, portable terminal device includes:

- a first radio communication part provided in the device for performing a wireless communication with a first network;
- a second radio communication part built in the device for performing a wireless communication with a second network;
- a control part for, upon reception of an incoming call request from the first network, selecting an apparatus from apparatuses which have established communications over the second network with the second radio communication part, in accordance with a predetermined order of priority; and
- a communication adapting part for establishing a communication between the selected apparatus and the first network.

According to the above portable terminal device, an apparatus to establish a communication is selected in accordance with a predetermined order of priority. Thus, the most suitable apparatus at relevant time and location can be automatically selected as a destination of an incoming call.

BRIEF DESCRIPTION OF THE DRAWINGS

FIG. 3 is a diagram showing a data structure of a calling-server caller-ID database of an embodiment of the present invention.

FIG. 4 is a diagram showing a data structure of a device database of an embodiment of the present invention.

FIG. 9 shows an operational diagram of still another embodiment of the present invention.

DETAILED DESCRIPTION OF THE PREFERRED EMBODIMENTS

In the following, principles and embodiments of the present invention will be described with reference to the accompanying drawings.

Figure 1:
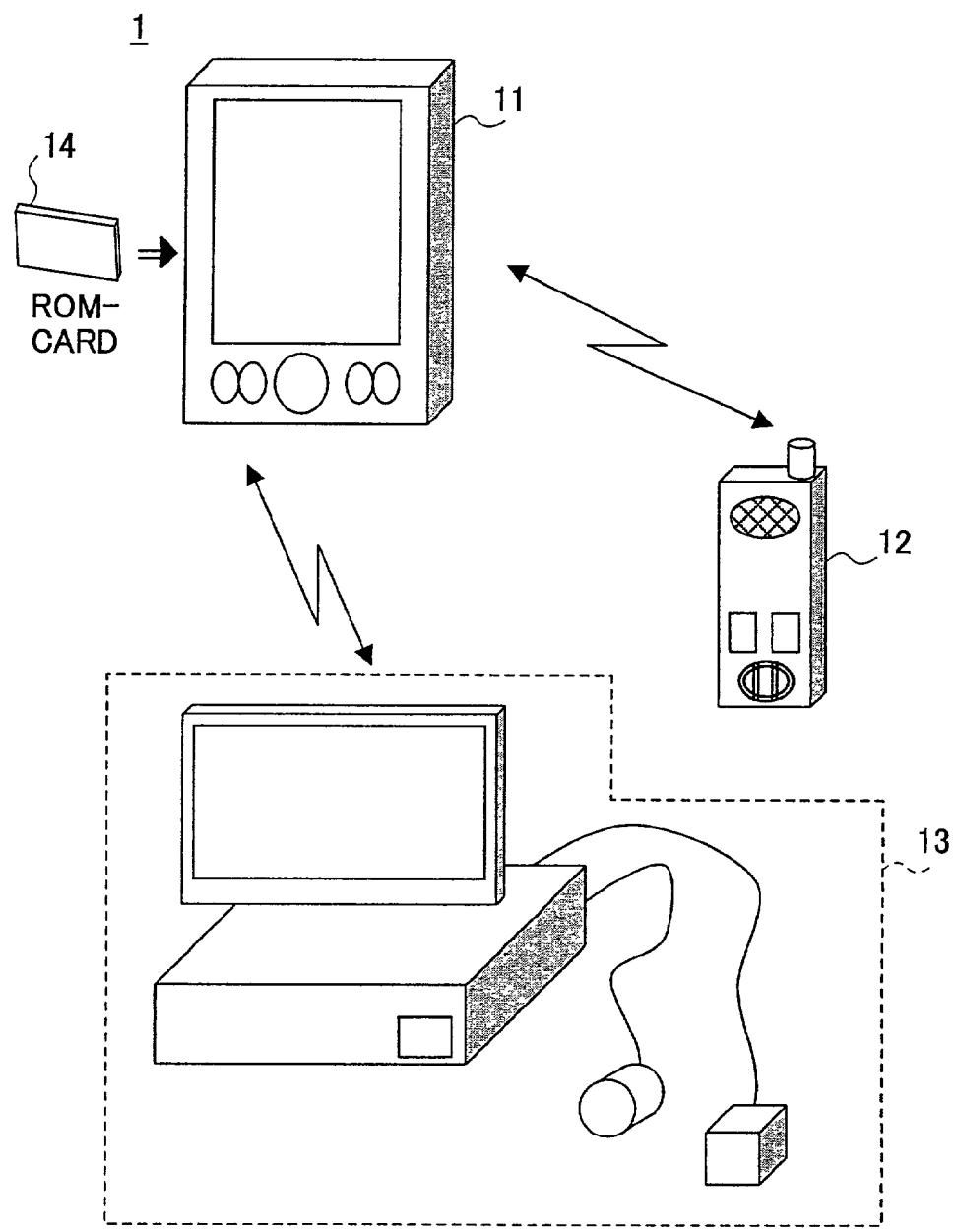
FIG. 1 is a diagram showing a system configuration of the present invention.

FIG. 1 is a diagram showing a system configuration of the present invention. A system 1 of the present embodiment includes a portable terminal device 11, a handset 12 and a car-navigation system 13. The portable terminal device 11 is, for example, a personal management tool referred to as a personal digital assistant (PDA) which can perform data management or data processing. Also, the portable terminal device 11 can establish communications with a cellular phone network and communications with peripheral devices via a wireless local area network (wireless LAN).

A program which is stored in a removable recording medium such as a ROM-card 14 or downloaded from a recording medium of another computer system is input to and is complied in the portable terminal device 11. This program includes a program for causing the portable terminal device 11 to control wireless communications. In the present embodiment, the recording medium is embodied as a ROM-card 14. However, the recording medium is not limited to a removable recording medium such as IC card memories, but may also include recording mediums which are accessible by a computer system which is coupled via a communication means.

The handset 12 can communicate with the portable terminal device 11 via the wireless LAN. Thus, the handset 12 can make a phone conversation by communicating with the portable terminal device 11 via the wireless LAN and then communicating with the cellular phone network via the portable terminal device 11.

The car-navigation system 13 is, for example, mounted on a car and displays a map together with a mark indicating the position of the car. The car-navigation system 13 includes an audio input/output part for outputting a sound and for receiving voice instructions. Also, the car-navigation system 13 can communicate with the portable terminal device 11 via the wireless LAN such that telephone conversations can be made in a hands-free manner via the cellular phone network using the personal terminal device 11 and by using the audio input/output part of the car-navigation system.

Firstly, the structure of the portable terminal device 11 will be described.

Figure 2:
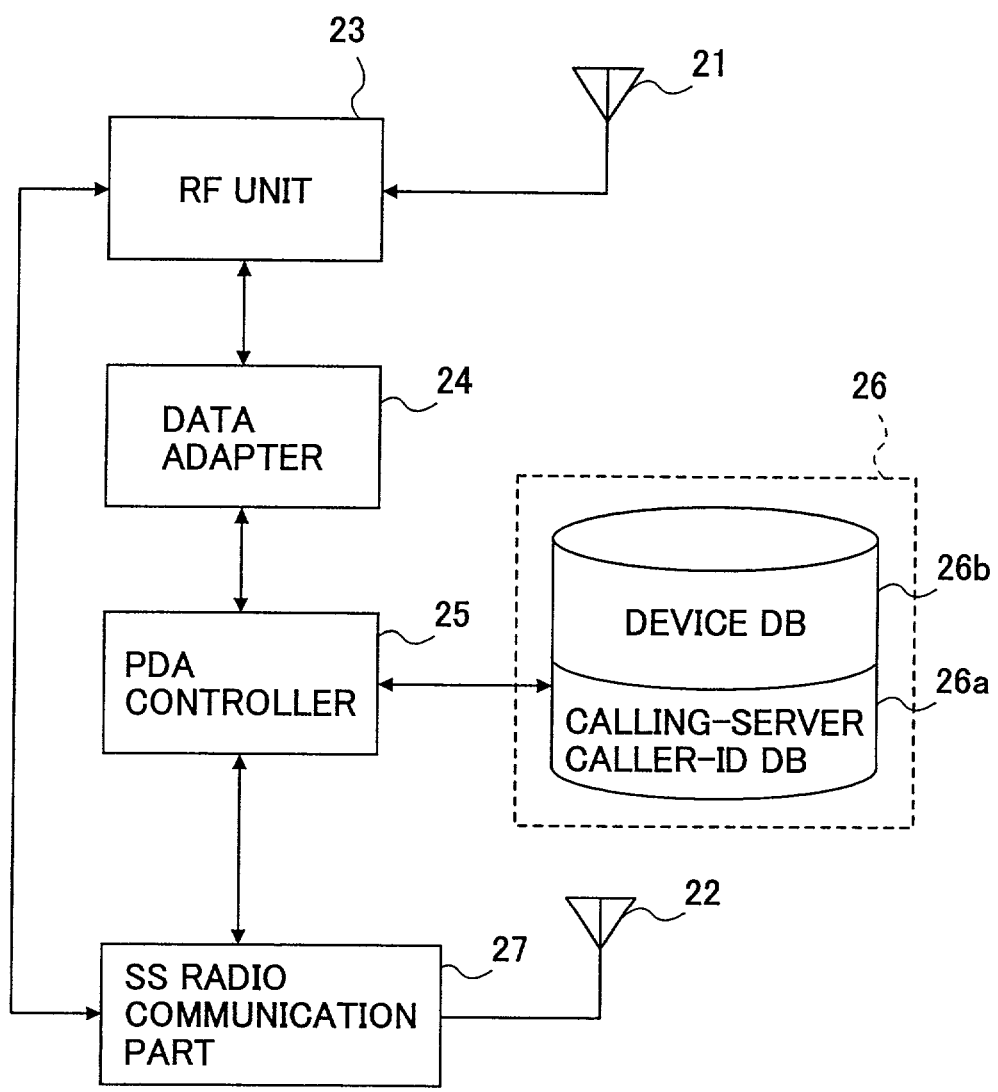
FIG. 2 is a block diagram showing a portable terminal device of an embodiment of the present invention.

FIG. 2 is a block diagram showing a portable terminal device of an embodiment of the present invention.

The portable terminal device 11 includes antennas 21 and 22, a RF (radio frequency) unit 23, a data adapter 24, a PDA controlling part 25, a database 26, and a SS (spread spectrum) radio communication part 27.

The RF unit 23 establishes a communication with a wide area network such as a cellular phone network via the antenna 21. Also, the RF unit 23 performs data communications with the data adapter 24 and also audio signal communications with the SS radio communication part 27.

The data adapter 24 implements a conversion between the wireless layer and a data layer, so as to enable a data communication between the RF unit 23 and the PDA controlling part 25. The PDA controlling part 25 carries out various data processing processes in accordance with built-in programs. Also, the data adapter 24 selects a communication apparatus for when a call is received. The data adapter 24 also refers to data recorded in the database 26 so as to determine whether information received upon reception of a call is a data or a speech. Then the data adapter 24 performs a switching operation between various processes.

The database 26 includes a calling-server caller-ID database 26a and a device database 26b.

FIG. 3 is a diagram showing a data structure of a calling-server caller-ID database of an embodiment of the present invention.

The calling-server caller-ID database 26a stores caller IDs of servers transmitting data such as e-mails over a wide area network. The PDA controlling part 25 uses a caller ID on the wide area network to refer to the calling-server caller-ID database 26 upon receiving a call. If the received caller ID exists in the calling-server caller-ID database 26a, it is determined that the call originates from the server and includes data. Thus, the PDA controlling part 25 establishes a data-line connection.

Also, if the received caller ID does not exist in the calling-server caller-ID database 26a, it is determined that the call from the server is for making a phone conversation. Thus, the PDA controlling part 25 establishes an audio-line connection.

Now, the device database 26b will be described.

FIG. 4 is a diagram showing a data structure of a device database of an embodiment of the present invention.

The device database 26b stores information related to items such as device name, device ID, fixed address, priority, applicable time and applicable location. Device ID indicates a network ID within a communication area by the wireless LAN of the portable terminal device 11. Fixed address indicates a global address. Priority indicates the priority of the connections of the audio-line, and is for example evaluated by digits "1" through "9". The digit "1" has the highest priority and the priority decreases as the digit indicates a higher value. Applicable time indicates the time where the connection of the audio-line has priority over the data-line. Applicable location indicates the location where the connection of the audio-line has priority over the data-line.

When there is a phone conversation request, the PDA controlling part 25 refers to the device database 26b to look up for the applicable time and applicable location of each of the presently detected apparatuses, and establishes an audio-line for an apparatus having the highest priority.

Processes using the database 26 will be described later.

When the PDA controlling part 25 attempts to establish communications with other peripheral apparatuses via the wireless LAN, it communicates data with the SS radio communication part 27. Via the antenna 22, the SS radio communication part 27 communicates with apparatuses such as the handset 12 and the car-navigation system 13 provided at peripheral locations. The SS radio communication part 27 is capable of communicating data and audio.

Now, the structure of the handset 12 will be described.

Figure 5:
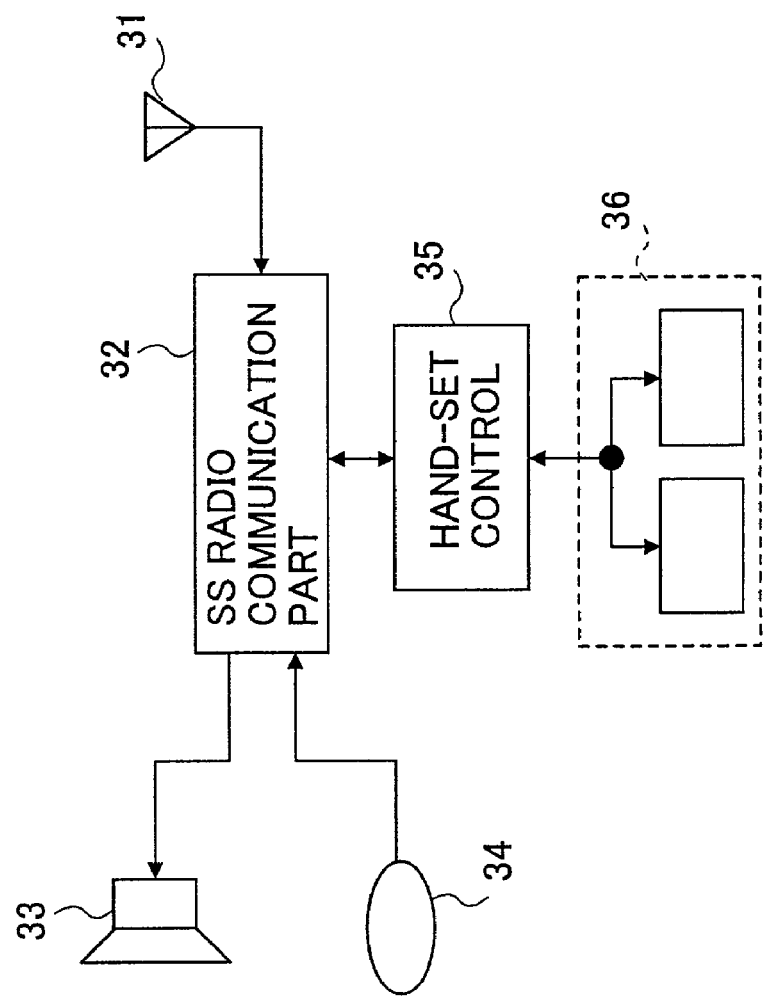
FIG. 5 is a block diagram showing a handset of an embodiment of the present invention.

FIG. 5 is a block diagram showing a handset of an embodiment of the present invention.

The handset 12 includes an antenna 31, a SS radio communication part 32, a loudspeaker 33, a microphone 34, a handset controlling part 35 and an operation part 36.

Via the antenna 31, the SS radio communication part 32 establishes an audio-line with an apparatus connected to the wireless LAN. The SS radio communication part 32 drives the loudspeaker 33 in accordance with the audio signal from the audio line so as to output sounds from the loudspeaker 33 while driving microphone 34 to output audio signals onto the audio line. The establishment of the audio line on the wireless LAN is controlled by the handset controlling part 35 in accordance with an operation of the operation part 36. Using the handset 12, a phone conversation can be made through the wide area network via the portable terminal device 11.

Now, the structure of the car-navigation system 13 will be described.

Figure 6:
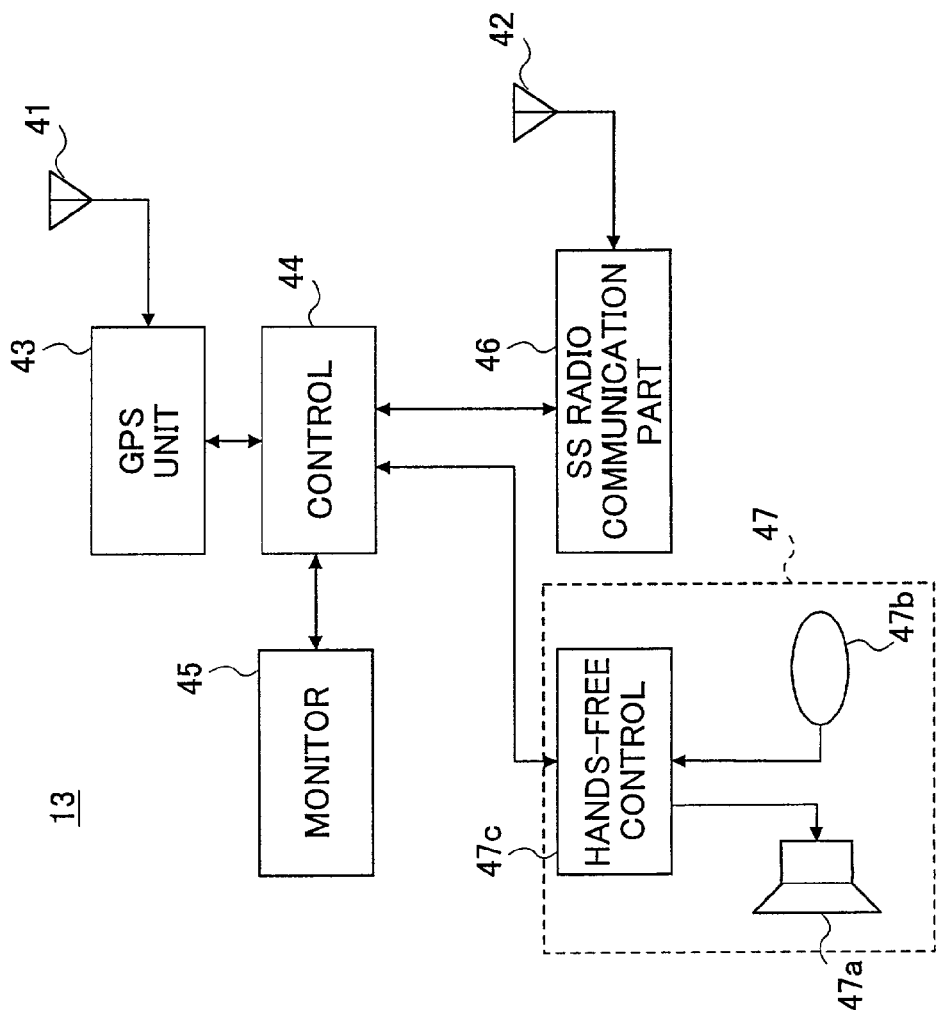
FIG. 6 is a block diagram showing a car-navigation system of an embodiment of the present invention.

FIG. 6 is a block diagram showing a car-navigation system of an embodiment of the present invention.

The car-navigation system 13 includes antennas 41 and 42, a GPS unit 43, a controlling part 44, a monitor 45, a SS radio communication part 46 and a hands-free unit 47.

The GPS unit 43 analyses GPS information received from the antenna 41 and obtains position information. The position information obtained by the GPS unit 43 is supplied to the controlling part 44. The controlling part 44 displays a map on the monitor 45 and indicates the position represented by the position information from the GPS unit 43 on the map.

The hands-free unit 47 includes a loudspeaker 47a, a microphone 47b and a hands-free controlling part 47c such that voice can be input/output in a hands-free manner. The hands-free unit 47 is designed such that an audio-line can be established with the wireless LAN by means of the SS radio communication part 46. Via the antenna 42, the SS radio communication part 46 establishes communications with the apparatuses on the wireless LAN.

Now, an operation of the present embodiment will be described with reference to the drawings.

Figure 7:
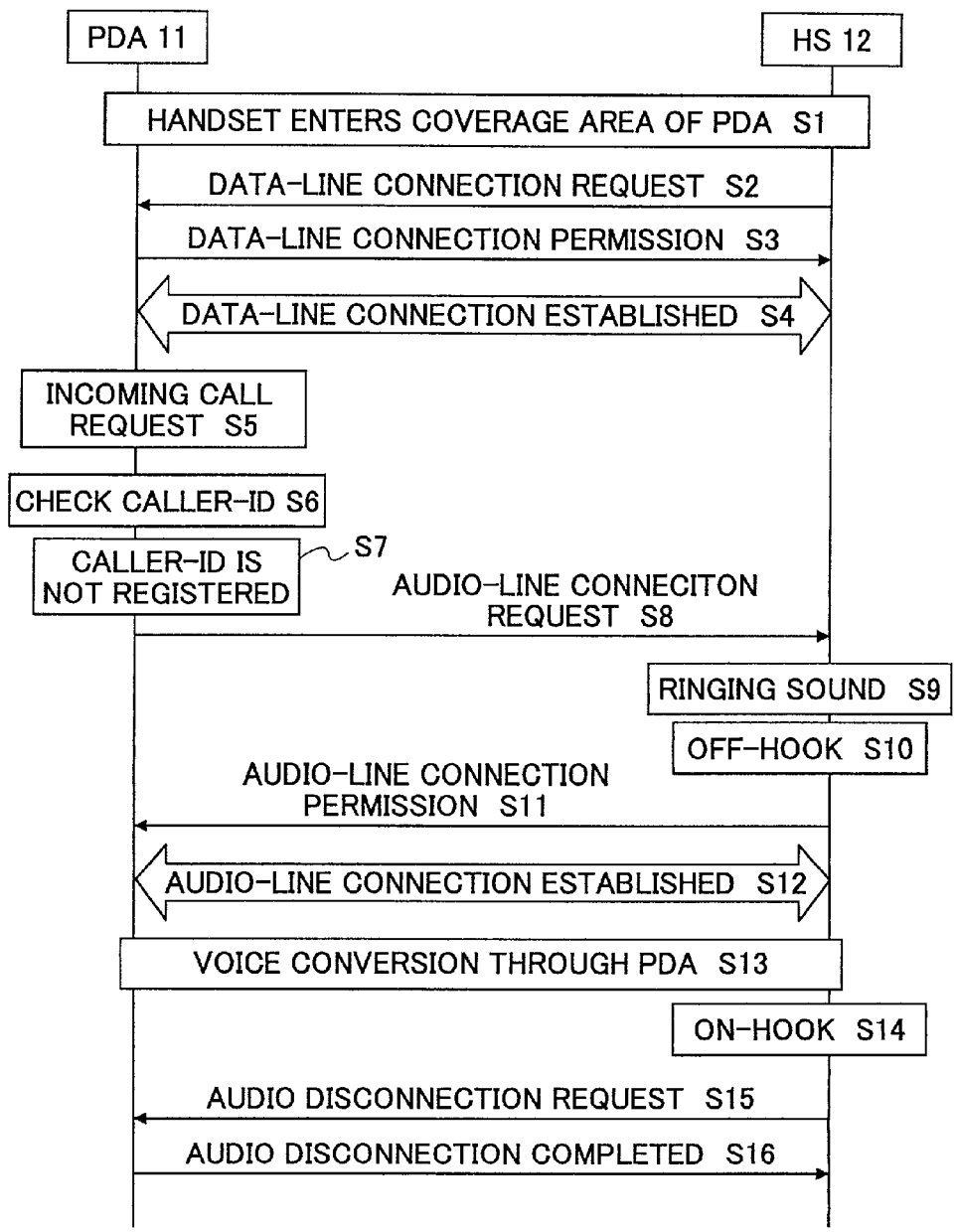
FIG. 7 shows an operational diagram of an embodiment of the present invention.
Figure 8:
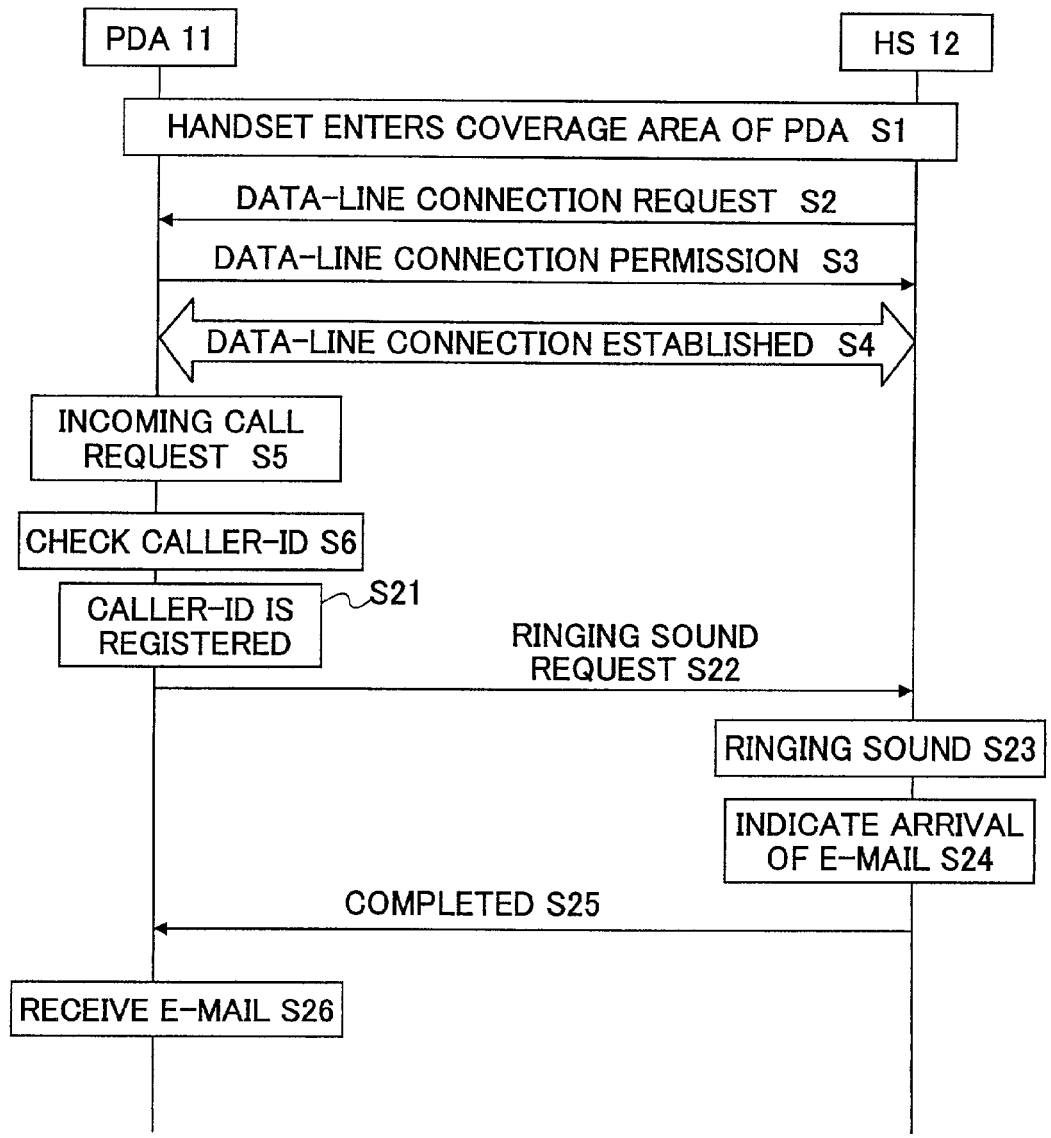
FIG. 8 shows an operational diagram of another embodiment of the present invention.

FIGS. 7 to 9 show operational diagrams of an embodiment of the present invention.

FIG. 7 shows an operation where there is an audio-line connection request under a condition where the handset 12 is in a coverage area of the wireless LAN of the portable terminal device 11 and the car-navigation system 13 is not in the coverage area of the wireless LAN of the portable terminal device 11.

The handset 12 enters the coverage area of the wireless LAN of the portable terminal device 11 in step S1. In step S2, a data-line connection request is supplied from the handset 12 to the portable terminal device 11.

In response to the data-line connection request from the handset 12, the portable terminal device 11 supplies a data-line connection permission to the handset 12. Thus, a data line connection is established in step S4.

The portable terminal device 11 receives a incoming call request from the wide-area network in step S5. Then, in step S6, the portable terminal device 11 refers to the calling-server caller-ID database 26a using the caller ID as a key and determines whether the caller ID is a caller ID that has been registered in the calling-server caller-ID database 26a.

In step S7, it is determined whether the received caller ID is registered in the calling-server caller-ID database 26a. If the received caller ID has not been registered, the portable terminal device 11 supplies an audio-line connection request to the handset 12 in step S8. Then, in step S9, the handset 12 produces a ringing sound in response to the audio-line connection request.

In step S10, the handset 12 is brought to an off-hook state. Then, in step S11, the handset 12 supplies an audio-line connection permission to the portable terminal device 11. When the portable terminal device 11 receives the audio-line connection permission from the handset 12, an audio-line connection is established in step S12. Thus, in step S13, a voice conversation is enabled between an apparatus on the wide area network and the handset 12 via the portable terminal device 11.

In step S14, the handset 12 is brought to an on-hook state. Then, an audio-line disconnection request is supplied from the handset 12 to the portable terminal device 11. Upon reception of the audio-line disconnection request from the handset 12, the portable terminal device 11 disconnects the audio line connection from the wide area network and notifies the handset 12 that the disconnection process has been completed.

Thus, a voice conversation can be made by means of the handset 12.

FIG. 8 shows an operation where there is a data-line connection request under a condition where the handset 12 is in a coverage area of the wireless LAN of the portable terminal device 11 and the car-navigation system 13 is not in the coverage area of the wireless LAN of the portable terminal device 11.

It is to be noted that in FIG. 8, process steps similar to those shown in FIG. 7 are indicated with similar reference numerals and will not be described in a further detail.

In step S6, the portable terminal device 11 determines whether the received caller ID is registered in the calling-server caller-ID database 26a. If it is determined in step S21 that the received caller ID is registered in the calling-server caller-ID database 26a, the portable terminal device 11 supplies the ringing sound request to the handset 12. In response to the ringing sound request from the portable terminal device, the handset 12 produces a ringing sound in step S23. In step S24, the handset 12 displays an indication of an arrival-of-mail.

After indicating the arrival-of-mail, the handset S12 supplies a notification of completion of indicating the arrival-of-mail. In step S26, the portable terminal device 11 receives an e-mail from the calling server and stores it in a memory.

The present embodiment can be summarized as follows. Upon reception of the call, the portable terminal device 11 of the present invention determines whether the received caller ID has been registered in the calling-server caller-ID database 26a. As in FIG. 7, if the caller ID has not been registered in the calling-server caller-ID database 26a, the call is determined as a speech call and the voice conversation by the handset 12 is enable. As in FIG. 8, if the caller ID has been registered in the calling-server caller-ID database 26a, the call is determined as a notification of an e-mail from the server. Then the reception of an e-mail is notified by the handset 12 and the e-mail can be received from the reception server. Accordingly, it is possible to determine whether the received call is a call through an audio line or through a data line, without having to install a special protocol stack into the portable terminal device 11. Thus, a push-type service of the data can be implemented.

FIG. 9 shows an operation where there is an audio-line connection request under a condition where the handset 12 and the car-navigation system 13 are in a coverage area of the wireless LAN of the portable terminal device 11.

In step S31, the car-navigation system 13 enters the wireless LAN communication area under a condition where the handset 12 is in the wireless LAN communication area of the portable terminal device 13 as shown in FIGS. 7 and 8. Then, in step S32, a data-line connection request is supplied from the car-navigation system 13 to the portable terminal device 11. In response to the data-line connection request from the car-navigation system 13, the portable terminal device 11 sends a data-line connection permission to the car-navigation system 13 in step S33. When the car-navigation system 13 receives the data-line connection permission from the portable terminal device 11, the data-line connection is established between the portable terminal device 11 and the car-navigation system 13 in step S34.

Then, the portable terminal device 11 receives an incoming call request from the wide-area network in step S35. In step S6, the portable terminal device 11 refers to the device database 26b using the device establishing a data-line connection as a key and carries out comparison of the priority of the connection to the wide area network. Here, a data-line connection is established between the handset 12 and the car-navigation system. Since the car-navigation system 13 has a highest priority in the device database 26b, in step S37, the car-navigation system 13 is selected as an apparatus to be connected.

Accordingly, the portable terminal device 11 supplies an audio-line connection request to the car-navigation system 13 in step S38. The car-navigation system 13 produces ringing sound in step S39. In step S40, the car-navigation system 13 is brought to an off-hook state, for example, by a voice input from the hands-free unit 47. In step S41, an audio-line connection permission is notified to the portable terminal device 11.

When the portable terminal device 11 receives the audio-line connection permission from the car-navigation system 13, an audio line connection is established between the portable terminal device 11 and the car-navigation system 13. When the establishment of the voice line connection has been completed, in step S43, a voice conversation with an apparatus on the wide area network can be made by the car-navigation system 13 via the portable terminal device 11.

In step S44, the car-navigation system 13 is brought to an off-set state. Then, in step S45, the car-navigation system 13 sends an audio-line disconnection request to the portable terminal device 11. Upon reception of the audio-line disconnection request from the car-navigation system 13, the portable terminal device 11 disconnects the audio-line connection with the wide area network and notifies the car-navigation system 13 that the audio-line disconnection process has been completed in step S46.

As has been described above, when the car-navigation system 13 is not detected on the wireless LAN, the handset 12 has a higher priority and the ringing sound is produced. When the user is in the car, the car-navigation system 13 is selected and the speech call is enabled by the hands-free unit 47 of the car-navigation system 13.

It is to be noted that with the processes shown in FIGS. 8 and 9, while a line connection is established between the handset 12 and the car-navigation system and the portable terminal device 11, the apparatus to be connected is selected in accordance with the priority. However, it is also possible to select an apparatus to be connected based on location and time stored in the device database 26b.

For example, in the device database 26b shown in FIG. 4, the priority may be determined in an order of (others)<(applicable location)<(applicable time)<(priority). Based on this order of priority, the following description relates to a case where the lines are connected for the portable terminal device 11 having various devices stored in the device-database 26b. For example, when an incoming call is received at 4 p.m. while the user is in the car, the car-navigation system 13 is selected and the ringing sound of the car-navigation system 13 is produced. Thus, a voice conversation is enabled using the hands-free unit 47 of the car-navigation system 13.

Also, when a call is received at 10 a.m. while the user is out-doors, the handset 12 is selected and the ringing sound of the handset 12 is produced. Thus, a voice conversation is enabled by means of the handset 12.

Further, when a call is received at home at 6 p.m., the handset with illumination is selected and generates a receiving sound. Also, a speech condition is enabled by means of the illumination handset.

When a notification alarm of a schedule is received from the portable terminal device 11, a pen-type handset is selected and an alarm sound is produced.

Further, the present invention is not limited to these embodiments, and variations and modifications may be made without departing from the scope of the present invention.

The present application is based on Japanese priority application No. 2001-28713 filed on Feb. 5, 2001 the entire contents of which are hereby incorporated by reference.

What is claimed is:

1. A portable information terminal device comprising:
a first radio communication part provided in said device for performing a wireless communication with a first network;
a second radio communication part built in said device for performing a wireless communication with a second network;
a control part for, upon reception of an incoming call request from said first network, selecting an apparatus from apparatuses which have established communications over said second network with said second radio communication part, in accordance with a predetermined order of priority; and
a communication adapting part for establishing a communication between said selected apparatus and said first network; wherein said first network is a cellular phone network and said second network is a wireless local area network.

2. The portable information terminal device as claimed in claim 1, said control part further comprising a database in which data related to said predetermined order of priority is stored.

3. The portable information terminal device as claimed in claim 2, wherein said data is priority of the apparatuses which can communicate with said second communication part.

4. The portable information terminal device as claimed in claim 2, wherein said data is applicable time for apparatuses which can communicate with said second communication part.

5. The portable information terminal device as claimed in claim 2, wherein said data is applicable locations for apparatuses which can communicate with said second communication part.

6. A portable information terminal device comprising:
a radio communication part provided in said device for performing a wireless communication with a network;
a type-of-line identifying part for, upon reception of an incoming call request from said network, identifying a type of line to be established in accordance with an incoming call destination, wherein said type of line is either a data-line or an audio line; and
a communication adapting part for establishing an audio-line connection when the audio line is identified in said type-of-line identifying part and establishing a data-line connection when the data-line identified in said type-of-line identifying part.

7. The portable information terminal device as claimed in claim 6, said identifying part further comprising a database in which said incoming call destination for each of predetermined types of line is stored,
said portable information terminal device further comprising an identifying part for referring to said database in accordance with said incoming call destination upon reception of a call, so as to identify a content of said database in accordance with said incoming call destination.

8. A method of controlling communications of a portable information terminal device including:
a first radio communication part provided in said device for performing a wireless communication with a first network; and
a second radio communication part built in said device for performing a wireless communication with a second network, said method comprising the steps of:

selecting, upon reception of an incoming call request from said first network, an apparatus from apparatuses which have established communications over said second network with said second radio communication part, in accordance with a predetermined order of priority; and establishing a communication between said selected apparatus and said first network;

wherein said first network is a cellular phone network and said second network is a wireless local area network.

9. The method as claimed in claim 8, wherein said predetermined order of priority is determined by priority of the apparatuses which can communicate with said second communication part.

10. The method as claimed in claim 8, wherein said predetermined order of priority is determined by applicable time for apparatuses which can communicate with said second communication part.

11. The method as claimed in claim 8, wherein said predetermined order of priority is determined by applicable locations for apparatuses which can communicate with said second communication part.

12. A method of controlling communications of a portable information terminal device comprising a radio communication part provided in said device for performing a wireless communication with a network, said method comprising the steps of:

upon reception of an incoming call request from said network, identifying a type of line to be established in accordance with an incoming call destination, wherein said type of line is either a data-line or an audio line; and establishing a line connection in accordance with the type of line identified in said type-of-line identifying part, wherein an audio-line connection is established when the audio line is identified and a data-line connection is established when the data-line is identified.

13. The method as claimed in claim 12, said portable information terminal device further comprising a database in which said incoming call destination for each of predetermined types of line is stored, said method further comprising the step of referring to said database in accordance with said incoming call destination upon reception of a call, so as to identify a line as the predetermined type of line if said incoming call destination is stored in said database and to identify a line as other type of line if said incoming call destination is not stored in said database.

14. A computer program product for use with a portable information terminal device having a first radio communication part provided in said device for performing a wireless communication with a first network and a second radio communication part built in said device for performing a wireless communication with a second network, wherein said first network is a cellular phone network and said second network is a wireless local area network, said computer program product comprising:

a computer readable medium having computer readable program code means embodied in said medium for causing communication control of said portable information terminal device, said computer program product having;

computer readable program code means for causing said computer to select, upon reception of a incoming call request from said first network, an apparatus from apparatuses which have established communications over said second network with said second radio communication part, in accordance with a predetermined order of priority; and computer readable program code means for causing said computer to establish a communication between said selected apparatus and said first network.

15. The computer program product as claimed in claim 14, wherein said predetermined order of priority is determined by priority of the apparatuses which can communicate with said second communication part.

16. The computer program product as claimed in claim 14, wherein said predetermined order of priority is determined by applicable time for apparatuses which can communicate with said second communication part.

17. The computer program product as claimed in claim 14, wherein said predetermined order of priority is determined by applicable locations for apparatuses which can communicate with said second communication part.

18. A computer program product for use with a portable information terminal device having a radio communication part provided in said device for performing a wireless communication with a network, said computer program product comprising:

a computer readable medium having computer readable program code means embodied in said medium for causing communication control of said portable information terminal device, said computer program product having;

computer readable program code means for causing said computer to, upon reception of an incoming call request from said network, identify a type of line to be established in accordance with an incoming call destination, wherein said type of line is either a data-line or an audio line; and computer readable program code means for causing said computer to establish a line connection in accordance with the type of line identified in said type-of-line identifying part wherein an audio-line connection is established when the audio line is identified in said type-of-line identifying part and a data-line connection is established when the data-line is identified in said type-of-line identifying part.

* * * * *